United States Patent
Stroh

(10) Patent No.: US 9,234,474 B2
(45) Date of Patent: Jan. 12, 2016

(54) CONTROL ORIENTED MODEL FOR LNT REGENERATION

(75) Inventor: David J. Stroh, Columbus, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 2635 days.

(21) Appl. No.: 11/769,783

(22) Filed: Jun. 28, 2007

(65) Prior Publication Data

US 2009/0000274 A1    Jan. 1, 2009

(51) Int. Cl.
| | |
|---|---|
| *F01N 3/00* | (2006.01) |
| *F02D 41/02* | (2006.01) |
| *F01N 3/08* | (2006.01) |
| *F01N 11/00* | (2006.01) |
| *F02D 41/14* | (2006.01) |

(52) U.S. Cl.
CPC .......... *F02D 41/0275* (2013.01); *F01N 3/0814* (2013.01); *F01N 11/002* (2013.01); *F02D 41/1445* (2013.01); *F02D 41/1454* (2013.01); *F02D 2200/0802* (2013.01); *F02D 2200/0806* (2013.01); *F02D 2200/0811* (2013.01); *Y02T 10/24* (2013.01); *Y02T 10/47* (2013.01)

(58) Field of Classification Search
USPC ............ 60/273, 274, 284–287, 299–301, 277
See application file for complete search history.

(56) References Cited

U.S. PATENT DOCUMENTS

| | | | | |
|---|---|---|---|---|
| 5,894,725 | A  * | 4/1999  | Cullen et al. ................... | 60/274 |
| 6,119,449 | A  * | 9/2000  | Kohler ............................ | 60/274 |
| 6,269,633 | B1 * | 8/2001  | van Nieuwstadt et al. ..... | 60/277 |
| 6,829,885 | B2 * | 12/2004 | Surnilla et al. ................. | 60/274 |
| 6,901,745 | B2 * | 6/2005  | Schnaibel et al. .............. | 60/285 |
| 2006/0016178 | A1 | 1/2006 | Audoin | |

FOREIGN PATENT DOCUMENTS

| | | |
|---|---|---|
| DE | 10039708 A1 | 8/2000 |
| GB | 2320331 A | 6/1998 |

OTHER PUBLICATIONS

Office Action dated Nov. 15, 2011 from the German Patent Office for German Patent Application No. 10 2008 029 877.8; 8 pages.

* cited by examiner

*Primary Examiner* — Jesse Bogue

(57) ABSTRACT

A method of determining an amount of nitrogen oxides (NOx) stored in a NOx trap of an engine exhaust assembly may include determining a mass flow rate of NOx into the NOx trap, determining an efficiency of storing of the NOx within the trap, and calculating the amount of NOx stored in the NOx trap based on the determined mass flow rate and the determined efficiency. The method may further include determining a mass flow rate of a reductant entering the NOx trap, determining a relationship between the determined reductant mass flow rate and the NOx removed from the NOx trap, and calculating the amount of NOx removed from the NOx trap based on the determined mass flow rate and the determined relationship. The calculated amount of NOx stored may be adjusted by subsequent amounts of calculated NOx stored and subsequent amounts of NOx removed from the NOx trap.

13 Claims, 3 Drawing Sheets

CONTROL ORIENTED MODEL FOR LNT REGENERATION

FIELD

The present disclosure relates to engines, and more specifically to a method of determining an amount of NOx stored in a lean NOx trap of an engine exhaust system.

BACKGROUND

The statements in this section merely provide background information related to the present disclosure and may not constitute prior art.

A vehicle may include an engine and an exhaust system having a lean NOx trap (LNT) catalyst with a plurality of channels through which engine exhaust passes. Surfaces of the channels may be impregnated, for example, with barium salts and platinum or other precious metals. During lean operation of the vehicle engine (an air-to-fuel ratio greater than 14.7), the catalyst may adsorb oxides of nitrogen (NOx) from the engine exhaust. The nitrogen oxides (typically NO and $NO_2$) may be stored on the catalyst surface. The catalyst may periodically be exposed to a rich fuel environment (an air-to-fuel ratio less than 14.7), during which the catalyst may be converted (or regenerated), i.e., the stored NOx is reduced. Specifically, the nitrogen oxides may be converted to nitrogen, carbon dioxide and water in the presence of heat, carbon monoxide and hydrocarbons in the exhaust stream.

LNT catalysts may effectively store NOx at temperatures lower than temperatures at which they can effectively reduce the stored NOx. At low temperatures, for example, at temperatures less than about 300° C., a LNT catalyst may store NOx for a limited time, i.e., until it becomes full of NOx, or saturated. The saturated catalyst may be heated to a temperature exceeding the low range, and the heated catalyst may undergo regeneration.

SUMMARY

Accordingly, a nitrogen oxide (NOx) monitoring system may be provided for a NOx trap of an engine exhaust assembly. The system may include a mass air flow sensor, a lambda sensor, a NOx sensor, and a control module. The mass air flow sensor may be in communication with an air supply to the engine and may determine an amount of air entering the engine. The lambda sensor may be in communication with the exhaust system and may determine a ratio between an operating air-fuel ratio and a stoichiometric air-fuel ratio. The NOx sensor may be in communication with the exhaust system and may determine a concentration of NOx therein. The control module may receive inputs from the mass air flow sensor, the lambda sensor, and the NOx sensor. The control module may calculate an amount of NOx stored in the NOx trap based on the inputs.

A method of determining an amount of NOx stored in the NOx trap may include determining a mass flow rate of NOx into the NOx trap, determining an efficiency of storing of the NOx within the trap, and calculating the amount of NOx stored in the NOx trap based on the determined mass flow rate and the determined efficiency. The method may further include determining a mass flow rate of a reductant entering the NOx trap, determining a relationship between the determined reductant mass flow rate and the NOx removed from the NOx trap, and calculating the amount of NOx removed from the NOx trap based on the determined mass flow rate and the determined relationship. The calculated amount of NOx stored may be adjusted throughout vehicle operation by adding subsequent amounts of calculated NOx stored and subtracting subsequent amounts of NOx removed from the NOx trap.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
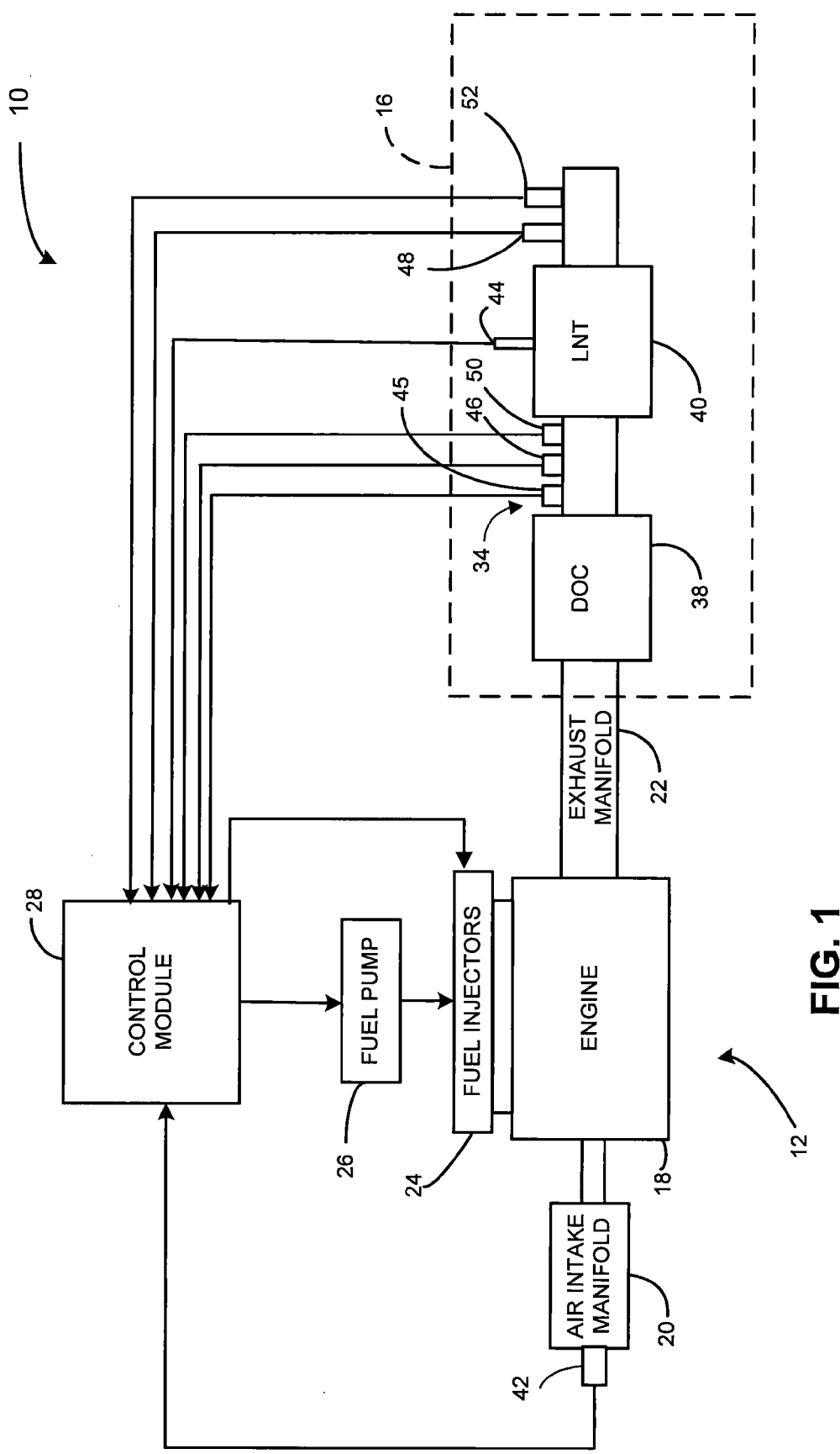
FIG. 1 is a schematic illustration of a vehicle according to the present disclosure.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

The present disclosure is generally directed to using LNT catalysts for vehicle emission control. Referring now to FIG. 1, a vehicle 10 may include an engine assembly 12 and a catalytic converter assembly 16. Engine assembly 12 may include a diesel engine 18, an air intake manifold 20, an exhaust manifold 22, fuel injectors 24, a fuel pump 26, and a control module 28. Air may be delivered to engine 18 through air intake manifold 20 and exhaust may exit engine 18 through exhaust manifold 22. Fuel may be delivered to engine 18 from fuel pump 26 through fuel injectors 24. Control module 28 may be operably connected to and control fuel injectors 24 and fuel pump 26.

Catalytic converter assembly 16 may be in communication with and receive exhaust gas from exhaust manifold 22. Catalytic converter assembly 16 may include a canister 34 having a first section 38 with a diesel oxidation catalyst (DOC) therein and a second section 40 having a lean NOx trap (LNT) therein. While a canister 34 is shown as a single canister, multiple canisters may be used according to packaging constraints.

During operation of engine 18, engine exhaust may pass from exhaust manifold 22 and through canister 34. During operation, LNT catalyst surfaces within canister 34 may store, or adsorb, oxides of nitrogen (NOx) from exhaust passing therethrough. A variety of sensors may be employed to monitor the NOx stored in canister 34 and provide signals to control module 28.

More specifically, vehicle 10 may include a mass air flow (MAF) sensor 42, temperature sensors 44, 45, first and second NOx sensors 46, 48, and first and second lambda (λ) sensors 50, 52. MAF sensor 42 may be disposed upstream of air intake manifold 20 and may provide a signal to control module 28 indicative of the mass flow rate of air into engine 18.

Temperature sensor 44 may be disposed at a central portion of the LNT within canister 34 and provide a signal to control module 28 indicative of the LNT temperature. An additional temperature sensor 45 may be located upstream of the LNT in canister 34 and may also be used in combination with temperature sensor 44 or by itself to provide a signal to control module 28 indicative of LNT temperature.

First NOx sensor 46 and first lambda sensor 50 may be disposed upstream of the LNT and second NOx sensor 48 and second lambda sensor 52 may be disposed downstream of the LNT. More specifically, as seen in FIG. 1, first NOx sensor 46 and first lambda sensor 50 may be disposed between first and second sections 38, 40 of canister 34 and, therefore, between the DOC and the LNT. Second NOx sensor 48 and second lambda sensor 52 may be disposed at an end of the LNT. As seen in FIG. 1, second NOx sensor 48 and second lambda sensor 52 may be disposed at an exit of canister 34. First and second NOx sensors 46, 48 may send signals to control module 28 indicative of the NOx concentration at the inlet and outlet of the LNT. First and second lambda sensors 50, 52 may send signals to control module 28 indicative of the operating air-fuel mixture upstream and downstream of the LNT. More specifically, the signal provided by lambda sensors 50, 52 may be indicative of the ratio between the operating air/fuel mixture at a given location and a stoichiometric air-fuel mixture.

Control module 28 may be used to determine the amount of NOx stored in canister 34 on the catalyst surfaces of the LNT, as well as to determine the amount of NOx removed from the catalyst surfaces of the LNT. The stored NOx may be converted (or regenerated) and removed from the LNT through exposure to heat, carbon monoxide and hydrocarbons in the exhaust stream, resulting in conversion of the NOx to nitrogen, carbon dioxide, and water.

Figure 2:
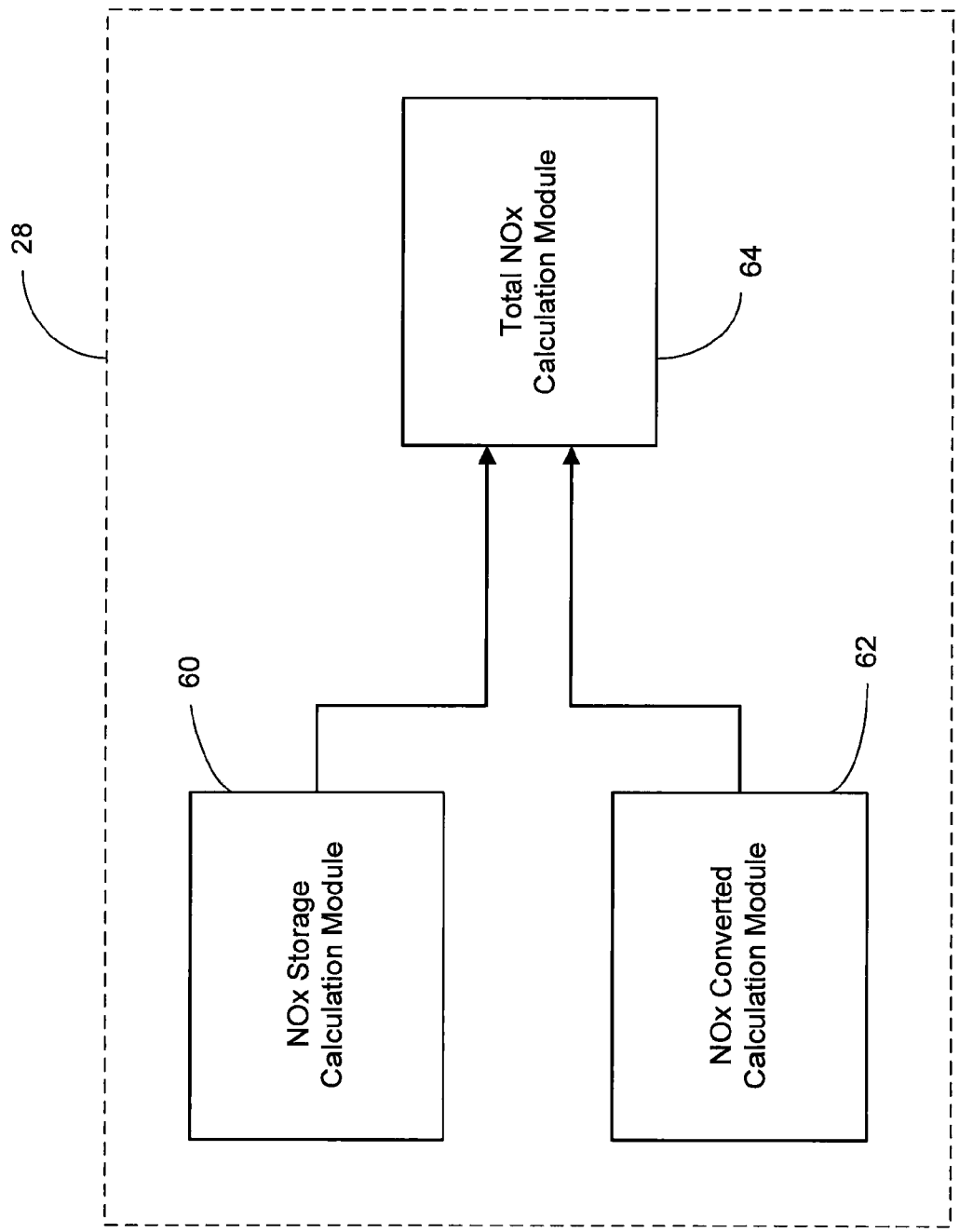
FIG. 2 is a functional block diagram of modules of the control module shown in FIG. 1.

With reference to FIG. 2, control module 28 may include a NOx storage calculation module 60, a NOx converted calculation module 62, and a total NOx calculation module 64. NOx storage calculation module 60 may determine the amount of NOx stored in the LNT. NOx converted calculation module 62 may determine the amount of NOx converted, and therefore removed from the LNT. Total NOx Calculation module 64 may determine the total NOx remaining in the LNT.

Figure 3:
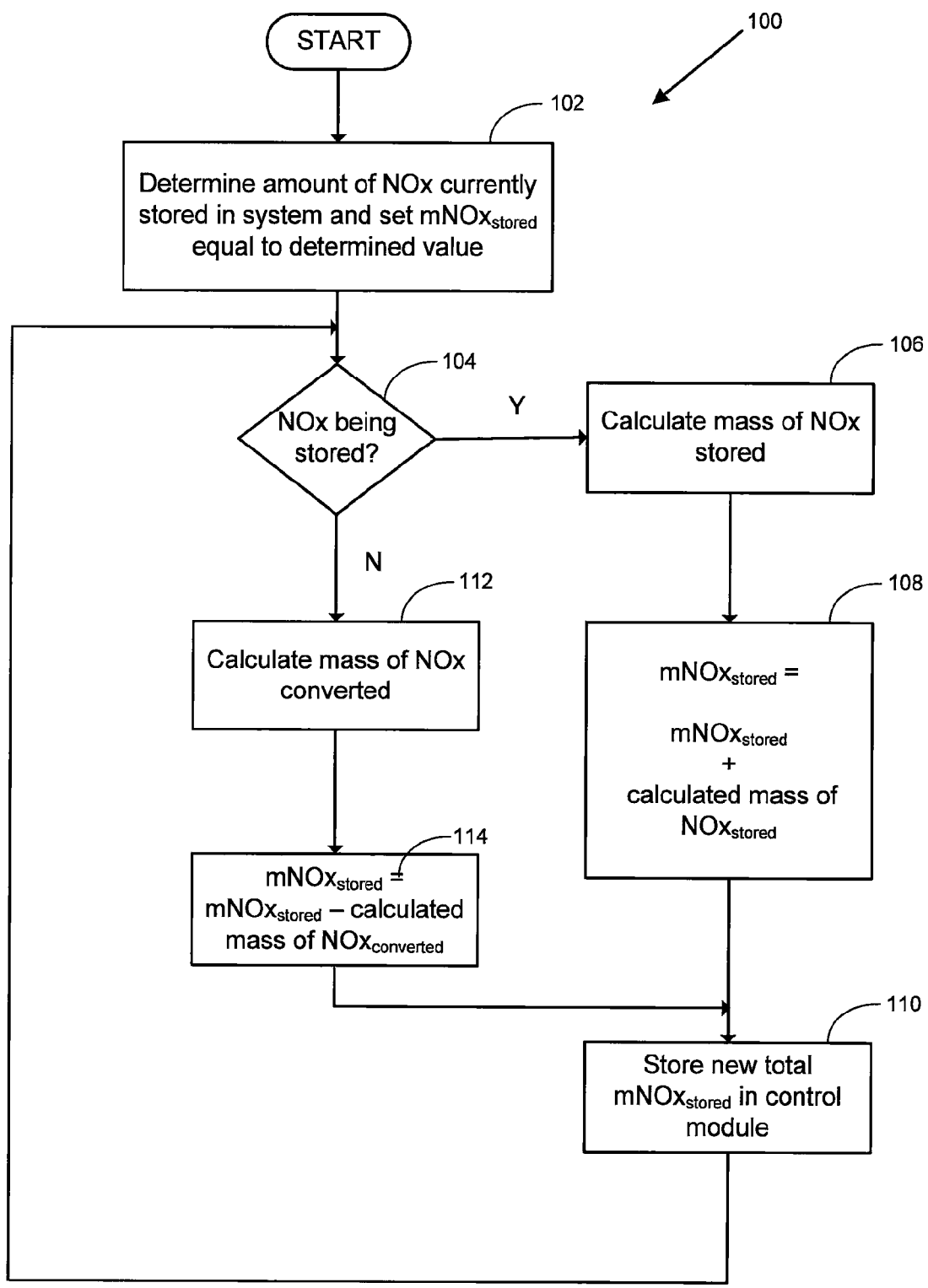
FIG. 3 is a flow chart illustrating a method of determining NOx stored in a vehicle exhaust system of FIG. 1.

As seen in FIG. 3, a method 100 for determining the amount of stored NOx is illustrated. Control block 102 determines the amount of NOx currently stored in the LNT. The total mass of NOx stored is set equal to the determined value. The current mass of NOx stored in the LNT may be provided by control module 28. Control module 28 may have the previous amount of NOx stored from a previous iteration of method 100. Alternatively, the first iteration of method 100 may use $mNOx_{stored}=0$ as an initial value. Method 100 then proceeds to decision block 104.

Decision block 104 determines if NOx is currently being stored in the LNT. This determination may include evaluation of an operating temperature of the LNT as well as a determination of a lean or rich fuel condition of engine 18. Alternatively, control module 28 may vary engine operating parameters, controlling whether NOx is being stored or converted by the LNT. If it is determined that NOx is being stored in the LNT, method 100 proceeds to control block 106.

Control block 106 determines the amount of NOx stored over a predetermined time interval. This determination may include calculating the amount of stored NOx, as indicated below:

$$mNOx_{stored} = \int (\dot{m}NOx_{in} \cdot \eta_{storage}(T_{LNT}, mNOx_{stored}))dt$$

where $mNOx_{stored}$ is the mass of NOx stored in the LNT, $\dot{m}NOx_{in}$ is the amount of NOx flowing into the LNT, and $\eta_{storage}(T_{LNT}, mNOx_{stored})$ is the NOx storage efficiency of the LNT.

The amount of NOx flowing into the LNT ($\dot{m}NOx_{in}$) may be determined from the exhaust flow ($\dot{m}_{exhaust}$) and one or both of NOx sensors 46, 48. The exhaust flow may be determined by measuring intake mass air flow ($\dot{m}_{inside}$) at MAF sensor 42 and adding the commanded fuel flow ($\dot{m}_{fuel}$). NOx storage efficiency of the LNT may be a predetermined function or look-up table for a given LNT and may be a function of LNT temperature and the current mass of NOx stored therein. LNT temperature may be determined from either or both of temperature sensors 44, 45. Method 100 then proceeds to control block 108.

Control block 108 determines the new total amount of NOx stored in the LNT. This determination may include adding the NOx stored over the time interval, as determined in control block 106, to the previous total amount of stored NOx. Method 100 may then proceed to control block 110 where the new total NOx stored is stored in control module 28 for subsequent use in control block 102. Method 100 may then proceed once again to decision block 104.

If it is determined that NOx is not being stored but converted in the LNT, method 100 proceeds to control block 112. Control block 112 determines the amount of NOx converted over a predetermined time interval. This determination may include calculating the amount of converted NOx, as indicated below:

$$mNOx_{converted} = \int (\dot{m}_{redctnt} \cdot RED2NOxRatio)dt$$

where $\dot{m}_{redctnt}$ is the mass flow of a reducing agent flowing into the LNT and RED2NOxRatio is an empirically derived ratio between the stored NOx and the reducing agent. More specifically:

$$\dot{m}_{redctnt} = \left(\frac{1}{\lambda} - 1\right) * \dot{m}_{exh}$$

where $\lambda$ is a ratio between an operating air-fuel mixture and a stoichiometric air-fuel mixture and $\dot{m}_{exh}$ is the mass flow rate of exhaust in the LNT. Lambda ($\lambda$) may be determined from a lambda sensor. More specifically, $\lambda$ may be determined from lambda sensor 50. The exhaust mass flow rate ($\dot{m}_{exh}$) may be determined as discussed above. The RED2NOxRatio may be a function of LNT temperature ($T_{LNT}$), space velocity (SV), and the stored NOx mass $$(mNOx_{stored}).$$

Determination of RED2NOxRatio may be experimentally determined with an LNT at a variety of conditions. The results collected may be used to develop the look-up table or function mentioned above. An example of such an experimental determination may include starting with an empty LNT trap at steady state conditions, such as the LNT in canister 34. An engine, such as engine 18 may be operated at a lean condition until a predetermined amount of NOx is collected in the LNT. The amount of NOx collected may be determined by measurement of the mass of NOx in the LNT after lean operation. Engine 18 may then be operated at a rich condition to regenerate the mass of NOx in the LNT. During rich operation, the reductant mass may be monitored using a lamda sensor, such as second lambda sensor 52, and integrated over the rich operation time. The reductant mass may be integrated until an inflection point is seen in the reductant measurement at second lambda sensor 52.

The inflection point detected at second lambda sensor 52 indicates completion of the regeneration process. Once completion of the regeneration process is detected, values for space velocity (SV) and LNT temperature ($T_{LNT}$) may be determined. Space velocity may be determined by:

$$SV = \dot{m}_{exh}/\text{AverageExhaustGasDensity}/\text{CatalystVolume}$$

where $\dot{m}_{exh}$ may be determined as indicated above, AverageExhaustGasDensity may be a known value for the density of the exhaust gas, and CatalystVolume may be the volume of the catalyst containing the LNT. Based on these values, the amount of NOx converted may be calculated. Method 100 then proceeds to control block 114.

Control block 114 determines the new total amount of NOx stored in the LNT. This determination may include subtracting the NOx converted over the time interval, as determined in control block 112, from the previous total amount of stored NOx determined at control block 102. Method 100 may then proceed to control block 110 where the new total NOx stored is stored in control module 28 for subsequent use in control block 102. Method 100 may then proceed once again to decision block 104.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A method of determining an amount of NOx stored in a NOx trap of an engine exhaust assembly for an engine, said method comprising:
    determining a mass flow rate of a reductant entering the NOx trap;
    determining a relationship between the determined reductant mass flow rate and an amount of NOx removed from the NOx trap;
    calculating the amount of NOx removed from the NOx trap based on the determined reductant mass flow rate and the determined relationship; and
    altering at least one operating parameter of the engine based on the calculated amount of NOx removed from the NOx trap.

2. The method of claim 1, wherein said calculating includes determining a product of the determined reductant mass flow rate and the determined relationship.

3. The method of claim 2, wherein the determining the mass flow rate and the determining the relationship between the determined reductant mass flow rate and the NOx removed from the NOx trap are performed at a predetermined time step, the calculating including integrating the product over the time step.

4. The method of claim 1, wherein the determining the mass flow rate includes determining a mass flow rate of exhaust from the engine entering the NOx trap and determining an operating air-fuel ratio.

5. The method of claim 4, wherein the determining of the mass flow rate of the reductant entering the NOx trap includes determining a ratio ($\lambda$) between the operating air-fuel ratio and a stoichiometric air-fuel ratio.

6. The method of claim 5, wherein the determining of the mass flow rate of the reductant entering the NOx trap includes determining the product of ($1/\lambda - 1$) and the mass flow rate of exhaust from the engine entering the NOx trap.

7. The method of claim 1, wherein the determining the relationship includes referencing a predetermined empirically based ratio between the reductant and the NOx removed from the NOx trap.

8. The method of claim 7, wherein the determination of the empirically based ratio includes operating an engine at a lean condition, measuring a NOx accumulation during the lean condition, operating the engine at a rich condition after the lean condition, and integrating the determined mass flow rate of the reductant during the rich condition until an inflection point is detected in a reductant mass measured downstream of the NOx trap.

9. The method of claim 8, wherein the determination of the empirically based ratio includes determining a space velocity and temperature associated with the NOx trap during the operation of the engine at the rich condition.

10. The method of claim 8, further comprising determining the average mass of reductant per unit mass of NOx removed during the rich condition.

11. The method of claim 1, wherein the determining the mass flow rate and the determining the relationship are performed during a rich condition of the engine.

12. The method of claim 11, further comprising determining a mass of NOx stored in the NOx trap during a lean condition of the engine.

13. The method of claim 12, wherein the calculating includes subtracting the amount of NOx removed from a previously determined amount of NOx stored.

* * * * *